United States Patent [19]
Baird

[11] Patent Number: 5,335,584
[45] Date of Patent: Aug. 9, 1994

[54] IMPROVED DIAPHRAGM

[76] Inventor: Dayne E. Baird, 705 Claybrook Dr., Altoona, Pa. 16602

[21] Appl. No.: 39,785

[22] Filed: Mar. 30, 1993

[51] Int. Cl.$^5$ ............................................. F01B 19/00
[52] U.S. Cl. ................................... 92/98 R; 92/103 F;
92/103 M; 92/104; 92/96
[58] Field of Search ............... 92/96, 98 R, 98 D, 99,
92/100, 103 F, 103 M

[56] References Cited

U.S. PATENT DOCUMENTS

| | | |
|---|---|---|
| 56,135 | 7/1866 | Wilson . |
| 116,669 | 4/1871 | Blake . |
| 1,793,621 | 2/1931 | Kelley . |
| 1,895,591 | 1/1933 | Spencer ............................ 92/103 M |
| 2,840,339 | 6/1958 | Price .................................. 92/103 F |
| 3,079,953 | 3/1963 | Mounteer . |
| 3,187,641 | 6/1965 | Bowditch . |
| 4,136,603 | 1/1979 | Doyl, Jr. ......................... 92/103 M |
| 4,375,182 | 3/1983 | Zavada . |
| 4,741,252 | 5/1988 | Harter et al. ..................... 92/98 D |
| 4,885,983 | 12/1989 | Zavada . |
| 5,054,373 | 10/1991 | Brault et al. ........................... 92/99 |

FOREIGN PATENT DOCUMENTS

| | | | |
|---|---|---|---|
| 0102449 | 8/1979 | Japan ................................ 92/103 M |

*Primary Examiner*—Thomas E. Denion
*Attorney, Agent, or Firm*—Wegner, Cantor, Mueller & Player

[57] ABSTRACT

The diaphragm has an outer flange and an inner portion which is deflectable relative thereto, with the inner portion having a lone, primary annular corrugation connecting a center of the inner portion to the outer flange and which, when viewed in cross section, has the general shape of one full cosine wave. A plurality of radially disposed waves present ridges to the high pressure side of the diaphragm, with each fairing in amplitude from a maximum generally midway of the diaphragm radius to zero generally at the center and at the outer flange. Each of the radial waves is arithmetically added to the primary wave so as to be integral therewith and has the general shape of one full cosine wave when viewed in cross-section both along and normal to the length of the ridge. In one embodiment, similarly shaped annular corrugations are added onto the primary corrugation as secondary annular waveforms so as to provide the diaphragm with greater sensitivity and longer deflection (stroke) capabilities. In another embodiment, the body of the diaphragm is constructed with a grid of reinforcing strands imbedded in rubber or a rubber-like material.

25 Claims, 13 Drawing Sheets

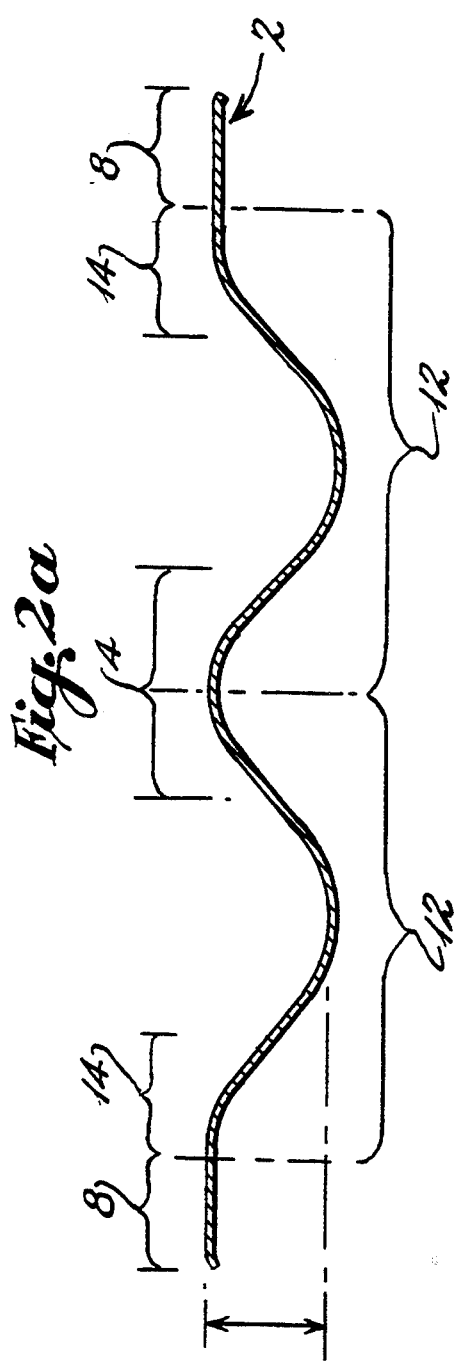 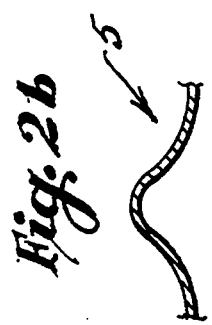 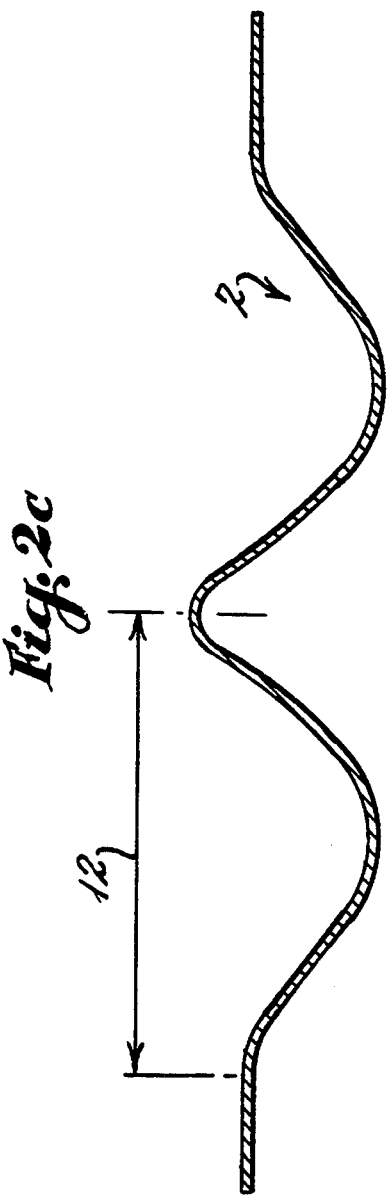

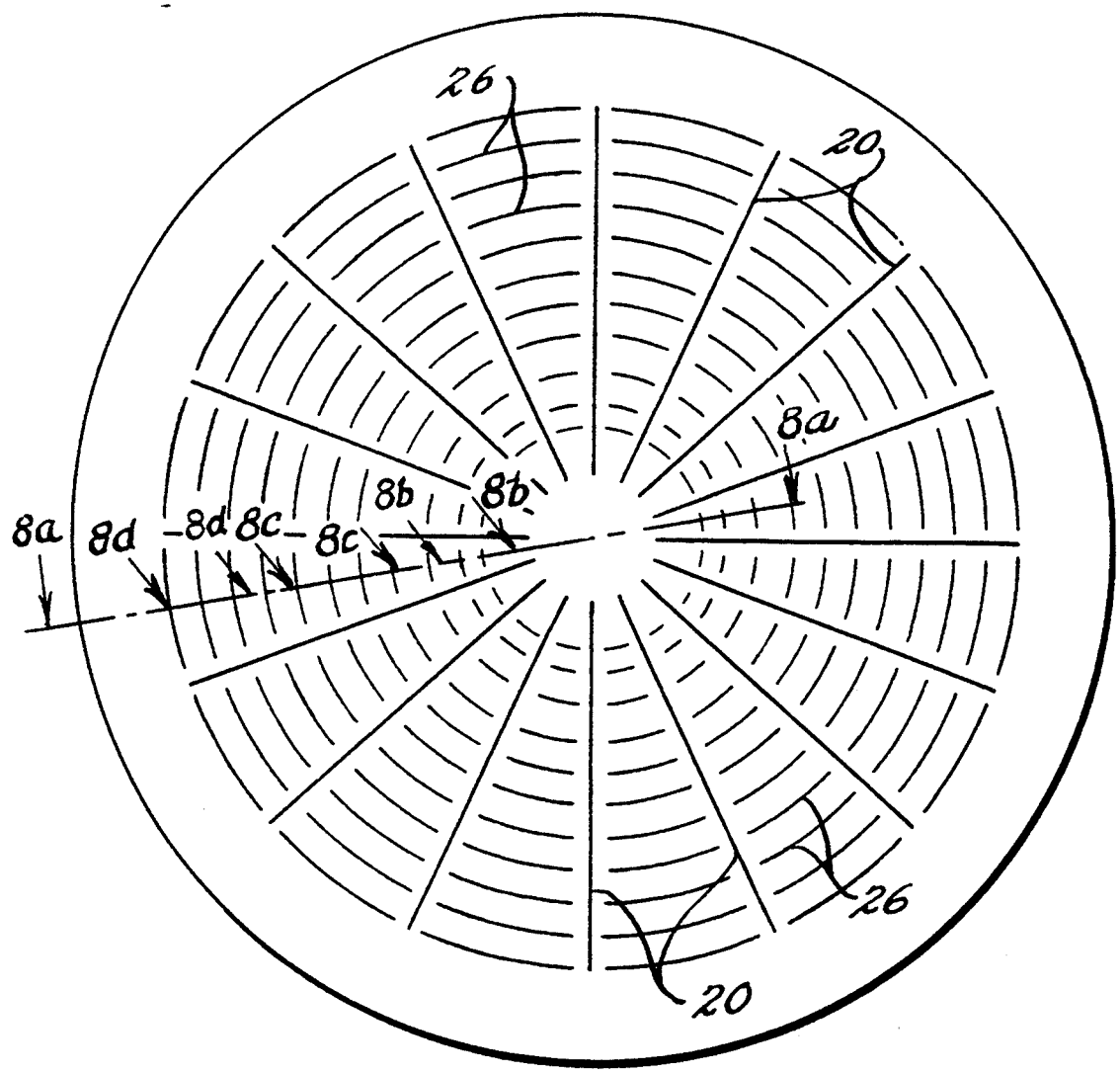

IMPROVED DIAPHRAGM

CROSS-REFERENCE TO THE PRIOR ART

U.S. Pat. No. 56,135 to Charles A. WILSON, entitled IMPROVEMENT IN STEAM-GAGES, dated Jul. 3, 1866.

U.S. Pat. No. 116,669 to Richard C. BLAKE, entitled IMPROVEMENT IN STEAM-GAGES, dated Jul. 4, 1871.

U.S. Pat. No. 1,793,621 to Cecil S. KELLEY, entitled METAL DIAPHRAGM, dated Feb. 24, 1931.

U.S. Pat. No. 3,079,953 to Carlyle A. MOUNTEER, entitled PRESSURE RESPONSIVE ELEMENT, dated Mar. 5, 1963.

U.S. Pat. No. 3,187,641 to Hoel L. BOWDITCH, entitled DIAPHRAGM, dated Jun. 8, 1965.

U.S. Pat. No. 4,375,182 to John R. ZAVODA, entitled ULTRA-SENSITIVE DIAPHRAGM WITH DUAL STRESS-RELIEF STRUCTURES, dated Mar. 1, 1983.

U.S. Pat. No. 4,885,983 to John R. ZAVODA, entitled SELF-RETAINING DIAPHRAGM SEAL, dated Dec. 12, 1989.

The disclosures of the above references are hereby incorporated into the instant application by reference thereto.

BACKGROUND OF THE INVENTION

The invention is directed to diaphragms which are self sustaining and flexible, and generally unstretchable once they are formed, with each diaphragm being formed to provide a peripheral flange by which the diaphragm is supported and held in place and an inner portion which is deflectable relative to the flange.

When opposite sides of a diaphragm are subjected to unequal pressures and flexed, stretching forces are applied radially and circumferentially. The two distinctly different types of stress are referred to as radial stress and circumferential stress (sometimes called "hoop stress"). The pressure differential also can cause shearing forces to occur at sharp angle intersections of portions of the surface, most notably at the transition between moveable and stationary portions of the diaphragm. With a sufficient pressure differential, developed forces can be focused to the central region of the diaphragm and result in "doming" if there is no means to limit deflection.

As one means of limiting deflection, a central member can be provided to offset the central loading forces such that a generally planar diaphragm will tend to deform permanently into an annular trough having its concavity on the high pressure side. For this reason, when forming a diaphragm having other than a planar surface, it is advantageous to preform and position the diaphragm so that major convexities are not on the high pressure side.

Heretofore, diaphragms have been formed with coaxial annular corrugations for the purpose of reducing or offsetting radial stresses from the deflection of the diaphragm. Also, in order to reduce or offset circumferential stresses and thus facilitate circumferential flexing of the diaphragm, radially disposed ribs or spokes have been added onto the annular corrugations.

With a generally non-planar, thin metal diaphragm having one or more annular corrugations, the metal of the corrugations tends to move radially towards the center of the diaphragm during deflection of the diaphragm toward the plane of the flange. This deflection of the diaphragm tends to reduce the diameter of a circular segment of metal particles so as to compress the metal of the segment into a smaller volume, with the resistance of the metal to such compression producing the "hoop stresses" and, ultimately, closing of the corrugation. On the other hand, the provision of radially directed corrugations or ridges allows for annular contraction and expansion so as to provide circumferential flexibility which counteracts "hoop stress".

Exemplary of a generally planar diaphragm having both annular and radial waveforms for stress relief are the devices of the above-referenced Zavoda patents. This prior art provides increased sensitivity over only a limited range of stroke distances and a limited central force loading capability and, since work is expressible as force times distance, it fails to accommodate any significant work.

Exemplary of a non-planar diaphragm being capable of accommodating central force loading is the device of the above-referenced Kelly patent which has a single annular trough and a plurality of radial corrugations. The radial corrugations inherently stiffen the trough and tend to limit sensitivity and stroke. Additionally, the angle of transition from the trough to a peripheral flange (and to a centrally disposed surface) of the diaphragm is sufficiently sharp as to restrict stroke distance. Thus, although able to accommodate rather significant central loading forces, the limiting of stroke distances restricts the amount of work capability.

The structure of the Kelly device also causes a concentration of forces at the relatively sharp "hinge" regions of transition between surfaces, most notably at the transition from the displaceable inner portion to the surrounding flange for retaining the diaphragm in a housing. An unexpectedly high pressure differential and/or repeated "hinging" of such diaphragms at lower pressure differentials leads to failures such as rupture or permanent deformation of the material at these "hinges".

It is an object of the invention to provide such a diaphragm with structural improvements over the prior art, specifically improvements in the shape and composition of the deflectable portion of the diaphragm.

Also, it is an object of the invention to minimize failures in those areas of a diaphragm which commonly have high failure rates from permanent deformation, by pressure differentials, of a convex surface configuration into that of a concave surface configuration (so called "blowout") and/or ruptures or the like, by the particular structure of the deflectable portion of the diaphragm and/or backing or limiting surfaces with which the deflectable portion contacts during use of the diaphragm.

Additionally, it is an object of the invention to prevent sharp "hinging" of such diaphragms in regions of transition between diaphragm surfaces of different cross-sectional contours, by means of physically modifying the areas of transition and/or providing backing surfaces which impose "smooth curve" behavior on the diaphragm material in these transition regions.

Further, it is an object of the invention to provide a diaphragm which is "sensitive" or easily deflects and recovers when subjected to slight pressure differentials, while also being capable of recovering after repeatedly deflecting further than prior art diaphragms which are proportionately similar in size.

Still further, it is an object of the invention to provide a diaphragm with an improved stroke distance and significant central force loading capability, resulting in significantly improved capacity to do work.

Another object of the invention is to provide such a diaphragm with a structure which provides improved "durability" for withstanding damage from extreme pressure differentials which are regularly and/or intermittently applied, whether or not they are anticipated.

These and other objects of the invention will become more apparent from the following disclosure, including the attached drawings.

BRIEF SUMMARY OF THE INVENTION

The diaphragm has an outer flange and an inner portion which is deflectable relative thereto, with the inner portion having a lone, primary annular corrugation connecting a center of the inner portion to the outer flange and which, when viewed in cross section, has the general shape of one full cosine wave. A plurality of radially disposed waves present ridges to the high pressure side of the diaphragm, with each fairing in amplitude from a maximum generally midway of the diaphragm radius to zero generally at the center and at the outer flange. Each of the radial waves is arithmetically added to the primary wave so as to be integral therewith and has the general shape of one full cosine wave when viewed in cross-section both along and normal to the length of the ridge. In one embodiment, similarly shaped annular corrugations are added onto the primary corrugation as secondary annular waveforms so as to provide the diaphragm with greater sensitivity and longer deflection (stroke) capabilities. In another embodiment, the body of the diaphragm is constructed with a grid of reinforcing strands imbedded in rubber or a rubber-like material.

The novel features which are considered to be characteristic of the invention are set forth in particular in the appended claims. However, the construction and method of operation of the invention, together with additional objectives and advantages thereof, will be understood better from the remaining disclosure when read in connection with the accompanying drawings.

BRIEF DESCRIPTION OF THE DRAWINGS

FIG. 1c is a view similar to that of FIG. 1b, and is intended to illustrate that the central force transmitting rod is adaptably attachable to either or both sides of the diaphragm by a threaded connection.

FIG. 2a is a schematic cross-sectional view along the diameter of a diaphragm having a single annular primary wave, and illustrating each side of center of the diaphragm as being generally cosine-shaped.

FIG. 2b graphically illustrates an amount by which the cross-sectional shape of the central portion of the diaphragm of FIG. 2a may be modified to arrive at the cross-sectional shape of FIG. 2c.

FIG. 2c is similar to FIG. 2a, but with the central portion thereof modified by an amount depicted in FIG. 2b so as to make the central portion of the diaphragm more resistant to blowout from pressure differentials and from tensile forces which result from central loading by a central force transmitting member.

FIG. 3b is a cross-section, as viewed generally in the direction of arrows 3b—3b of FIG. 3a.

FIG. 5b is a cross-section as viewed generally in the direction of arrows 5b–5b in FIG. 5a.

FIG. 5c is a cross-section as viewed generally in the direction of arrows 5c—5c in FIG. 5a.

FIG. 9 is a schematic isometric view of a diaphragm having the structure of FIGS. 8a–8d.

FIG. 10b is an enlarged isometric view of a portion of the diaphragm of FIG. 10a.

FIGS. 11b–11d are schematic cross-sections as viewed generally in the direction of the correspondingly numbered arrows in FIG. 11a.

DETAILED DESCRIPTION OF THE INVENTION

Figure 1A:
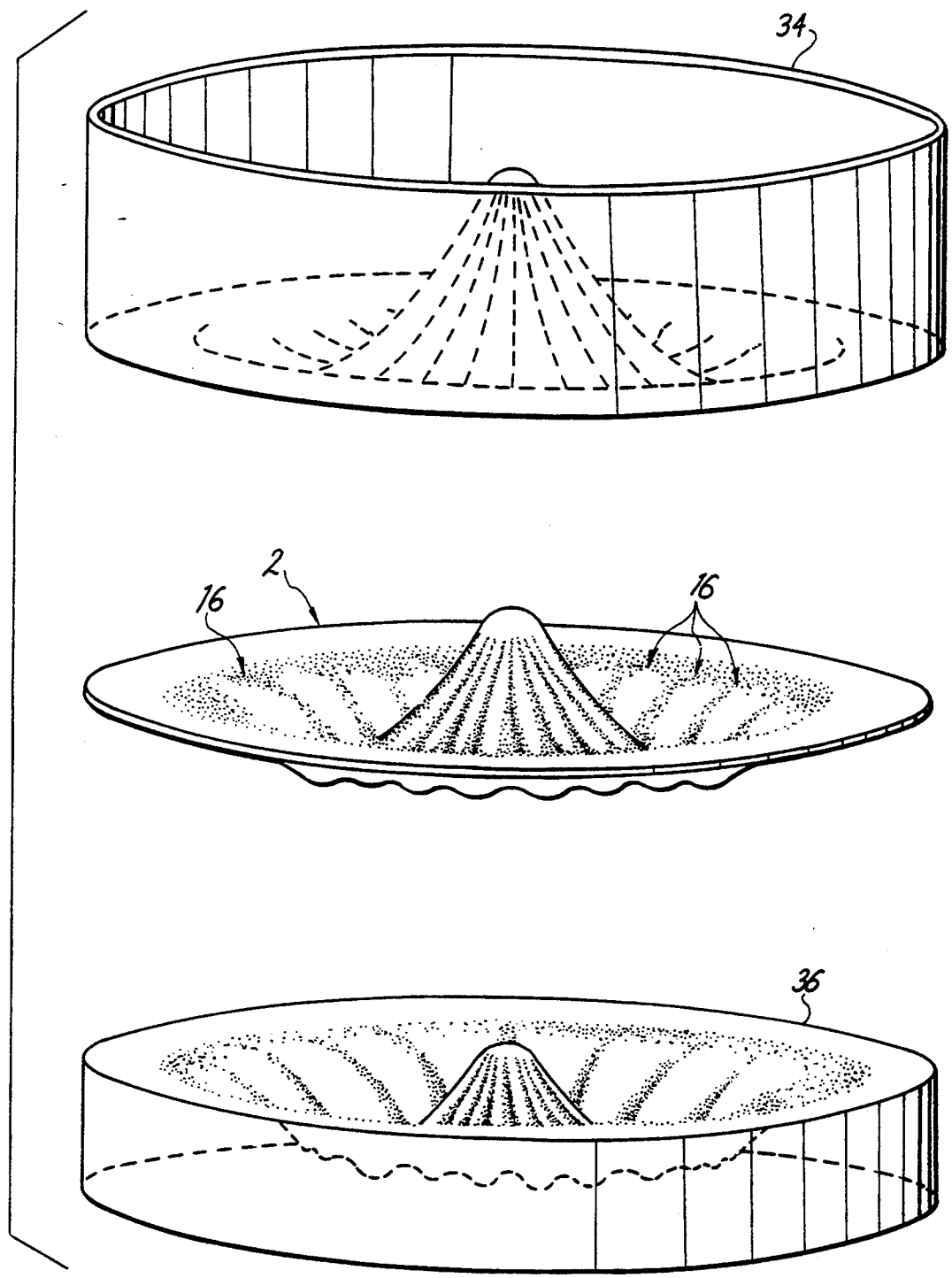
FIG. 1a is an exploded isometric view of the novel diaphragm and the top and bottom surfaces for limiting the extent of deflection of the diaphragm.

Referring to FIGS. 2a–2c, it has been found that maximum deflection and durability is provided for by forming a diaphragm 2 with a single annular primary wave 12 which cross-sectionally (from center to the perimeter) displays the general shape of a cosine wave. An annular primary wave 12 having such a shape allows relatively great deflection of the inner portion of the diaphragm while also providing smoothly curved contours in annular region 14 and central region 4. Part of the durability results from providing smoothly curved contours, over the surface of the diaphragm 2, which are sufficient to avoid relatively sharp transitions in those regions that historically are subject to early failure from "sharp hinging" damage, especially at the transition between the primary wave 12 and its limits at the center and periphery of the diaphragm 2.

The addition of radially disposed waves 16 in upon the primary annular wave 12 allows deflection of the diaphragm 2, with or without the illustrated central loading member 74, by providing for circumferential expansion in order to offset the "hoop stress" which was described above.

The addition of secondary annular waves 24 (FIG. 10b) or secondary annular waves 26 (FIG. 8c) to the primary waves 12 and radial waves 16 (as illustrated in FIGS. 8a–11) relieves stress in the steep sloped sidewalls of the radial waves 16 by allowing the trough, sidewalls and peaks of waves 16 to elongate or compress. When the central region of the diaphragm moves up or down with rolling of the primary wave 12, either of the secondary annular waves 24 or 26 is capable of relieving the stiffness of the radial waves 16 during deflection of the diaphragm. However, the secondary annular waves 26 of FIGS. 8a–8d are preferred or recommended for situations of extreme pressure differentials and, thus, high central loading. A particular advantage of secondary annular waves 26 in this situation is that radial tensile forces are carried along the ridge 20 of each radial wave 16 and thus are focused to the central region and a centrally disposed loading member to do work. Thus, these secondary annular waves 26 must have a pronounced amplitude in the troughs between the radial waves 16 and be relatively flat as they cross the ridge 20 of each radial wave 16 and generally conform to the rate of change of the amplitude of the radial waves 16 at all concentric distances from the center 4 of the diaphragm 2.

As seen in FIGS. 8a–8d, the amplitude of the secondary annular waves 26 fairs to zero when crossing the ridges of the radial waves 16. Further, the amplitude and wavelength of the secondary annular waves 26 are less than the size of those of the radial wave 16. Such a unique combination of waveforms allows for reduction of the inherent rigidity or stiffness of the radial waves 16. Thus the troughs between waves 16 allow expansion and compression of the secondary annular waves 26 while still providing resistance to stretching along the ridge 20 of the radial waves 16. As a result, transfer of the pressure differential forces as tensile forces to the central region 4 is maintained so as to provide for the diaphragm's ability to do work, while having a smooth and gradual distribution of surface forces and motion during deflection of the diaphragm 2. Alternatively, forces pushing on the low pressure side and or pulling on the high pressure side of diaphragm 2, via central moving member 74 and 76, respectively, can produce pressure differentials on the diaphragm 2.

The cross-sectional shape of the diaphragm of FIG. 2a is generally sufficient for handling only modest central loading of the diaphragm by a central force transmitting member. In those cases where the diaphragm is particularly susceptible to relatively high central loading, the steepness of the curve at the center 4 of the diaphragm 2 may be increased to further counteract any tendency for blowout of the diaphragm. In this regard, the center 4 of the diaphragm 2 of FIG. 2a may be modified, by arithmetic addition of the curve illustrated in FIG. 2b, to arrive at the structure of FIG. 2c.

Figure 10A:
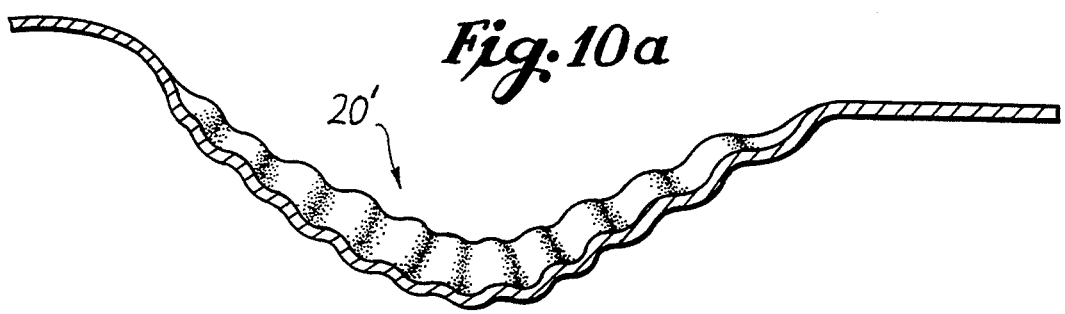
FIG. 10a is a cross-sectional view similar to that of FIG. 8a and illustrates an embodiment in which the secondary annular waves maintain their amplitudes as they ride over the ridges of the radial waves.
Figure 10B:
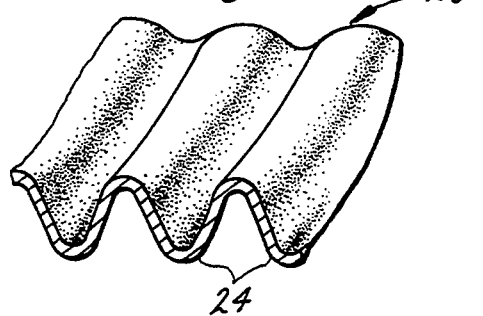

In situations of minimal central loading of diaphragm 2, plural concentric secondary annular waves 24 may be incorporated into the primary annular wave 12, as illustrated in FIGS. 10a and 10b. As may be seen, these additional annular waves 24 follow the contour of the radial and primary annular waveforms over the ridge 20' of radial waves 16 and in the valleys therebetween.

Figure 1B:
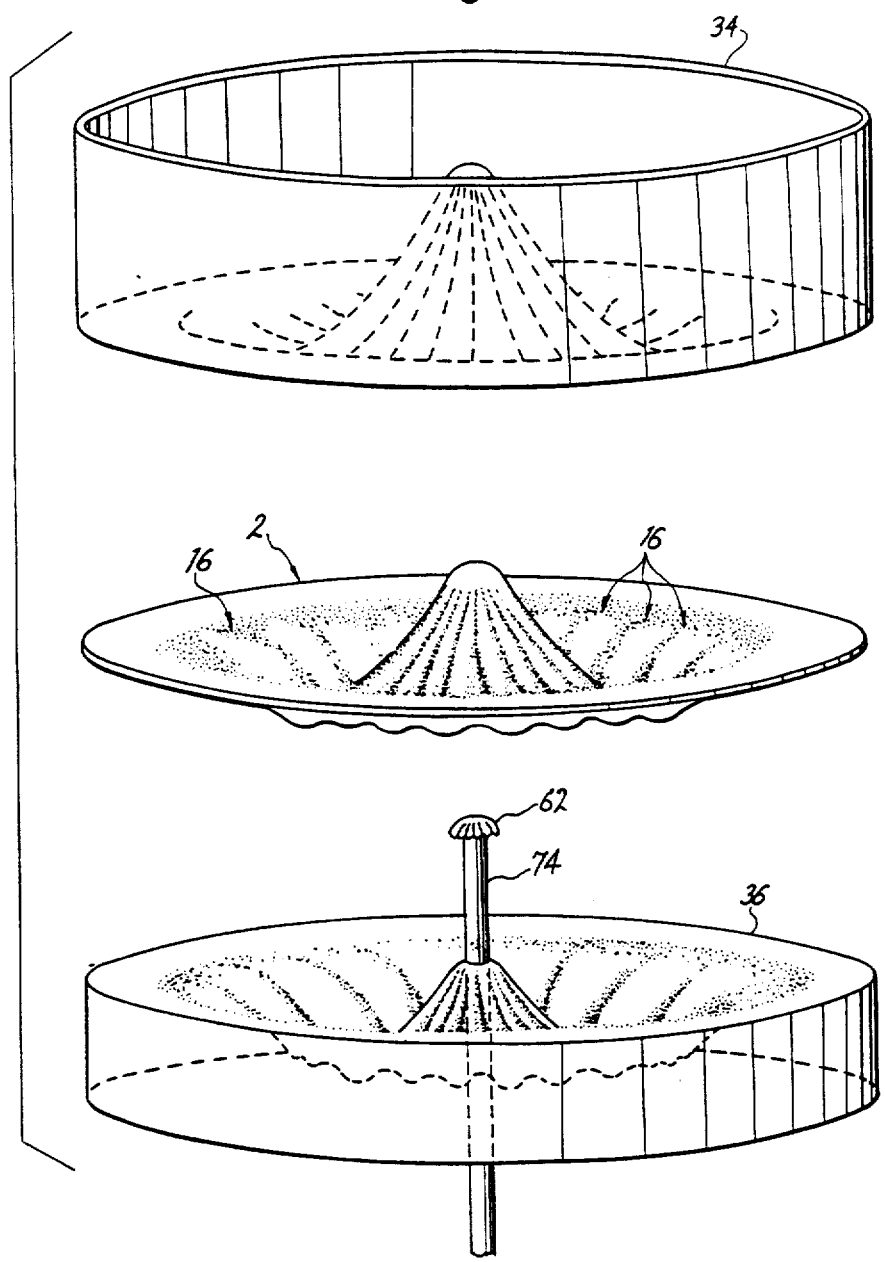
FIG. 1b is an exploded isometric view similar to that of FIG. 1a and illustrating the further provision of a central force transmitting rod and "sharp hinge" preventing surfaces on the low and high pressure sides.

As seen in FIGS. 1a–1c, the diaphragm 2 is adapted to be positioned between an upper deflection limiter 34 and a lower deflection limiter 36, both of which are constructed so that diaphragm 2 progressively nests with one or the other of limiters 34,36 as displacement of the diaphragm progresses. Members 34 and 36, in limiting the deflection of diaphragm 2, serve to prevent "blowout" and the resulting damage to the diaphragm. The inner surfaces of deflection limiters 34 and 36 are also contoured to prevent "sharp hinging" damage to the diaphragm which is most commonly found to occur in the annular region adjacent to the clamping flange of prior art diaphragms as well as in regions of flexure near the center of some diaphragms, most notably those having an attached, central force transmitting rod.

The deflection limiters 34 and 36 may be integral with the overall clamping assembly for the diaphragm or separately attachable thereto and may or may not have a force transmitting central member in conjunction therewith. For instance, force transmitting member 74 may slidably protrude through the center of deflection limiter 36 and be provided with a portion 62 for engaging the diaphragm 2 at the center 4 thereof so as to prevent "sharp hinging" damage during such high pressure deflection. In general, the higher of the two pressures is applied to or by the top side of diaphragm 2, as illustrated in these drawings.

In FIG. 1c, the central force transmitting member 74 is double ended so as to slidably extend through the upper and lower deflection limiters 34 and 36. As seen from the drawing, a force transmitting member interchangeably may extend through the top or bottom or both ends of the diaphragm assembly. To this end, rod 76 is threaded at 70 for reception into an internally threaded recess in the tip of member 74 or, alternatively, into a threaded nut on the underside of member 62. Of course, a screw (not shown) could be used to attach members 62 and 74.

Figure 4:
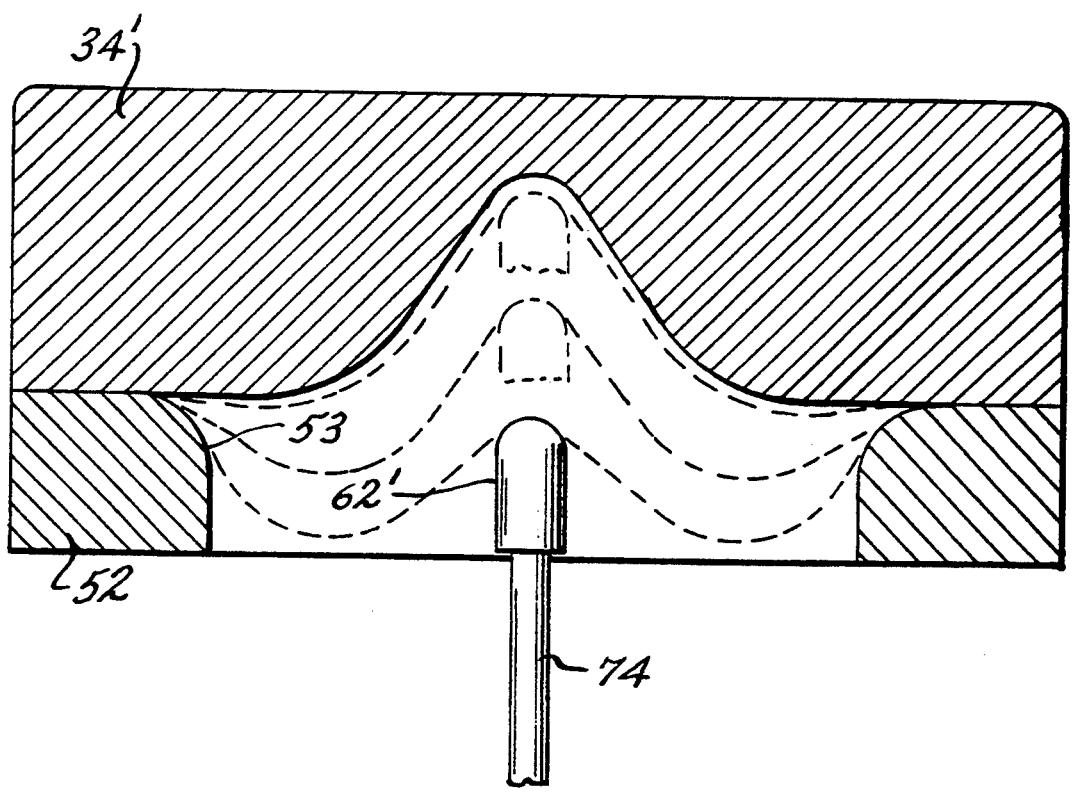
FIG. 4 is a cross-sectional view of a diaphragm assembly, in which the flange of the diaphragm is clamped between a deflection limiter on the high pressure side and an annular device which also acts as a backing device for engaging only the peripheral portion of the low pressure side of the diaphragm in order to prevent "sharp hinging" damage thereto during deflection of the inner portion. Also illustrated is a central force transmitting device having an enlarged, smooth tip for preventing "sharp hinging" damage to the center of the diaphragm.

FIG. 4 illustrates another manner in which so called "sharp hinging" can be prevented. Specifically, an annular member 52 can be used in place of deflection limiter 36 and is provided with a gentle curve 53 on the inner diameter thereof for engagement by the diaphragm 2 during displacement. Central backing member 62' is also provided at the tip of the force transmitting member 74.

Figure 5A:
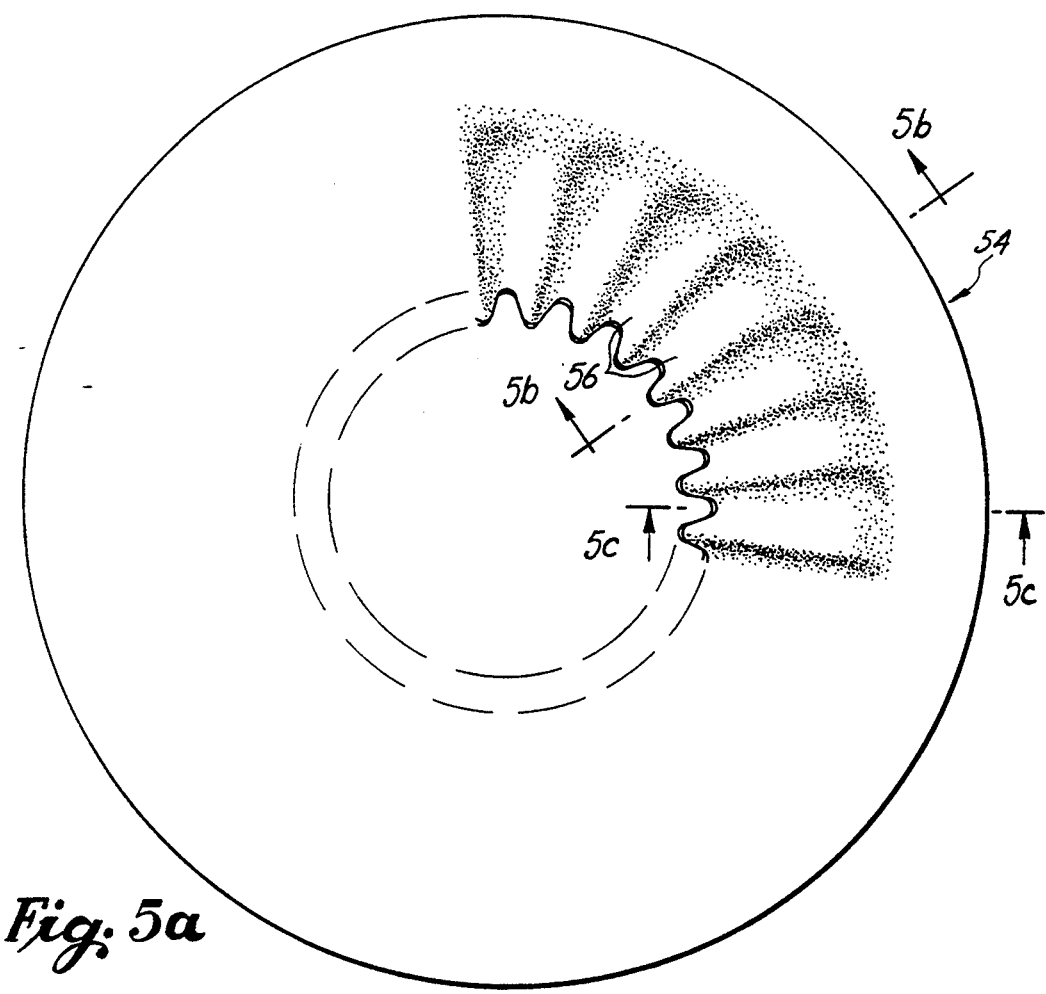
FIG. 5a is a top plan view of an annular backing device in which an inner peripheral region has knuckle portions protruding inwardly and upwardly for engagement with the low pressure side of the diaphragm.
Figure 5B:
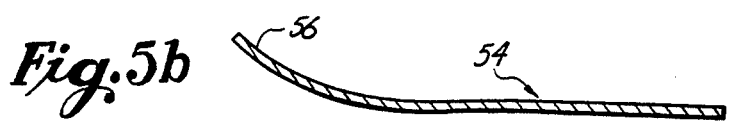
Figure 5C:
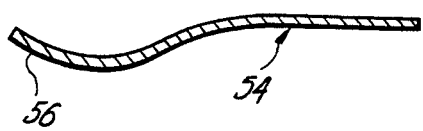

The device of FIG. 5a is open in the center and has a generally planar peripheral flange portion 54 which gently transitions into knuckle portions 56 that are nestable with the underside of the diaphragm so as to provide preloading of the diaphragm toward its high pressure side. When the diaphragm is mounted in its frame, these knuckles 56 support the perimeter region of the diaphragm on the low pressure side prior to and during flexing of the diaphragm away from the high pressure side, so as to eliminate a concentration of forces at the transition between the stationary and moving portions of the diaphragm.

Figure 6:
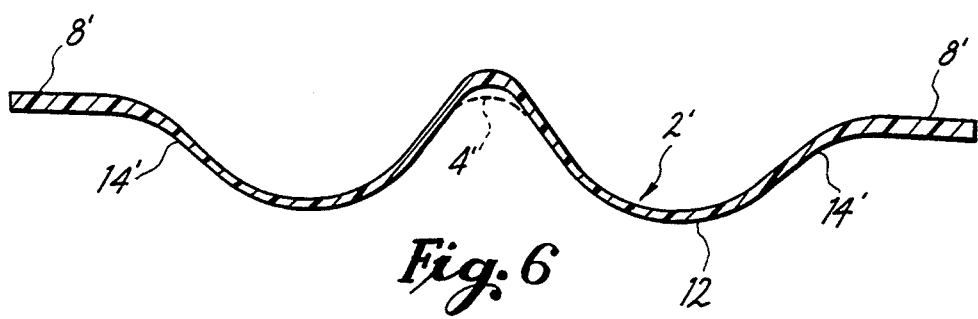
FIG. 6 is a cross-sectional view of a diaphragm with regions of increased thickness provided in order to avoid "sharp hinge" failure at the peripheral and central portions of the diaphragm.

FIG. 6 shows still another manner in which so called "sharp hinging" may be avoided. The diaphragm 2' is modified in structure so as to have thickened portions in the annular transition region 14' and, optionally, in the central portion 4'.

Figure 7:
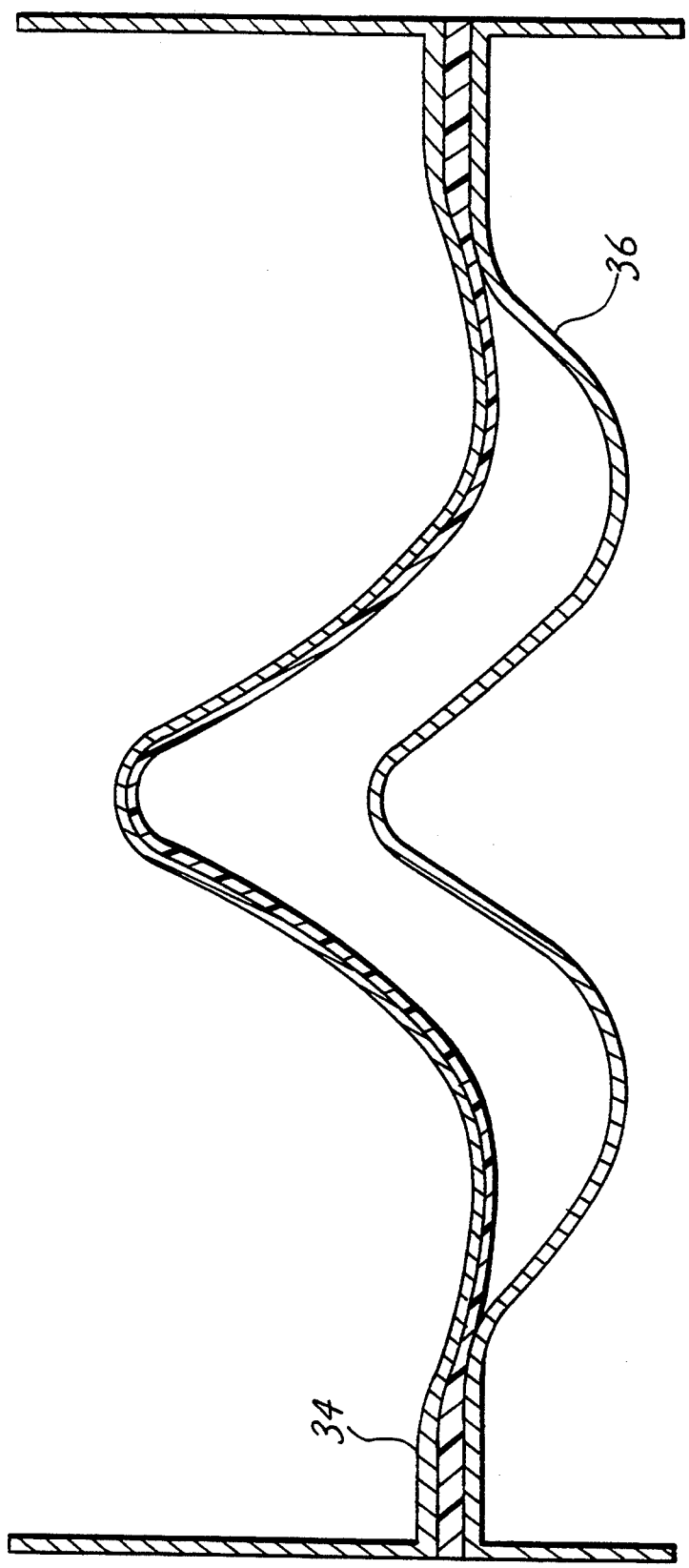
FIG. 7 depicts the configuration of a diaphragm similar to that of FIG. 6 when in a state of preloading.
Figure 8A:
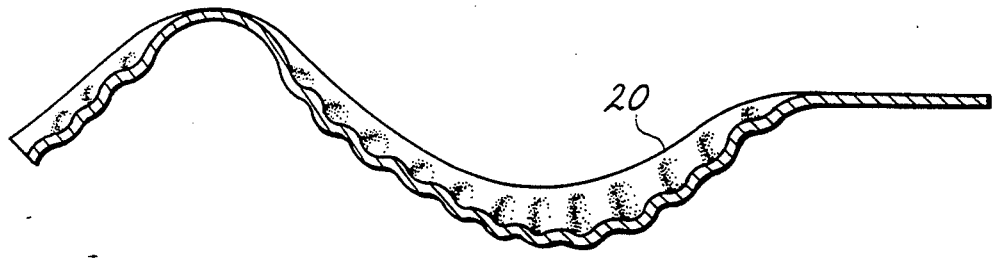
FIG. 8a is a diametrical cross-section of a diaphragm which, as schematically illustrated in FIG. 9, is modified to have secondary annular, cosine-shaped waves that are mathematically added to the cosine-shaped annular primary wave and that fair to zero at each ridge of the radial waves. The location of this cross-section is indicated by arrows 8a—8a in FIG. 9.
Figure 8B:
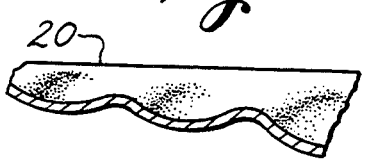
FIGS. 8b–8d are partial isometric views of three dimensional portions of the diaphragm of FIG. 8a, as viewed generally in the direction indicated by correspondingly numbered arrows in FIG. 9.
Figure 8C:
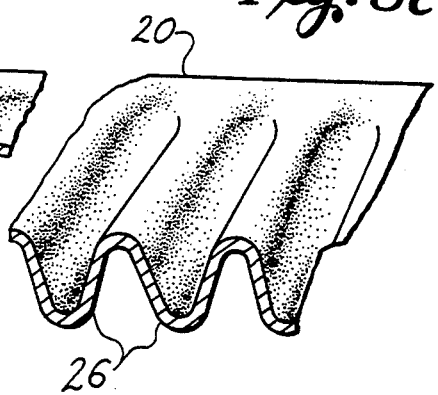
Figure 8D:

In FIG. 7, the diaphragm 2' of FIG. 6 is preloaded into nesting engagement with upper deflection limiter 34 by the upper and lower deflection limiters 34 and 36.

Figure 3A:
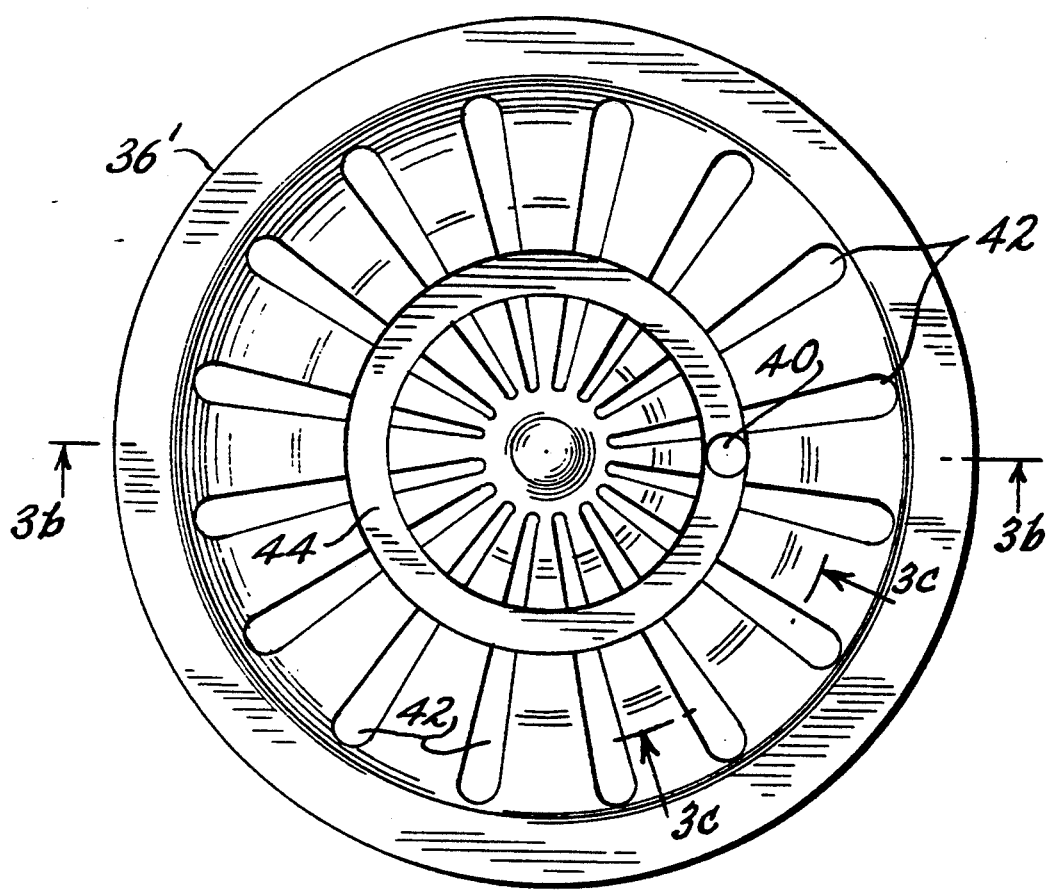
FIG. 3a is a plan view of the inside of one of the deflection limiters, for illustrating one of several structural modifications that can facilitate fluid flow in and out of the device when a diaphragm is nested in the deflection limiter.
Figure 3B:
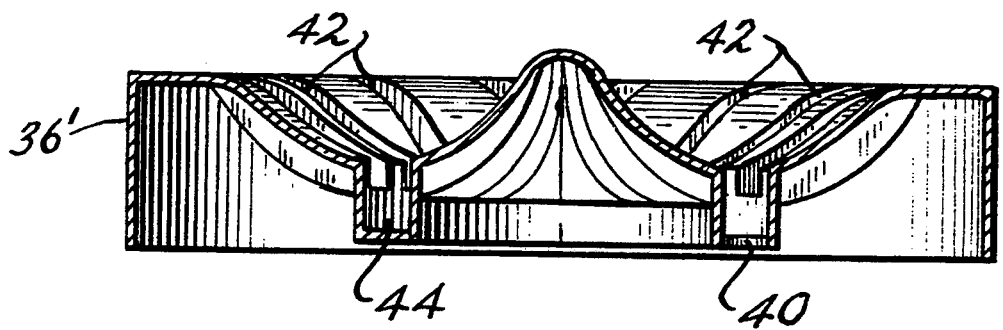
Figure 3C:
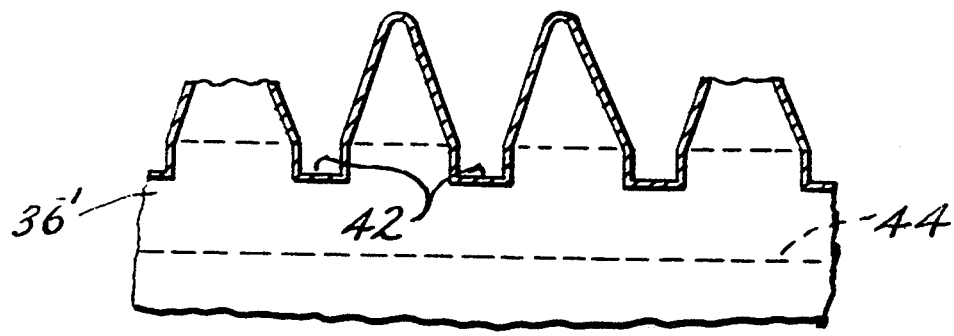
FIG. 3c is an enlarged partial cross-section, as viewed generally in the direction of arrows 3c—3c in FIG. 3b.

FIGS. 3a–3c illustrate a structure by which fluid may displace, or be displaced by, the diaphragm when it nests in a deflection limiter. Either or both of the deflection limiters 34 and 36 are provided with radiating channels 42 (covered by valleys between adjacent radiating waves 16 when the diaphragm 2 is nested in the deflection limiter) with a manifold 44 connecting the channels 42 to a threaded orifice 40 or the like by which fluid may enter and exit the device.

Figure 11A:
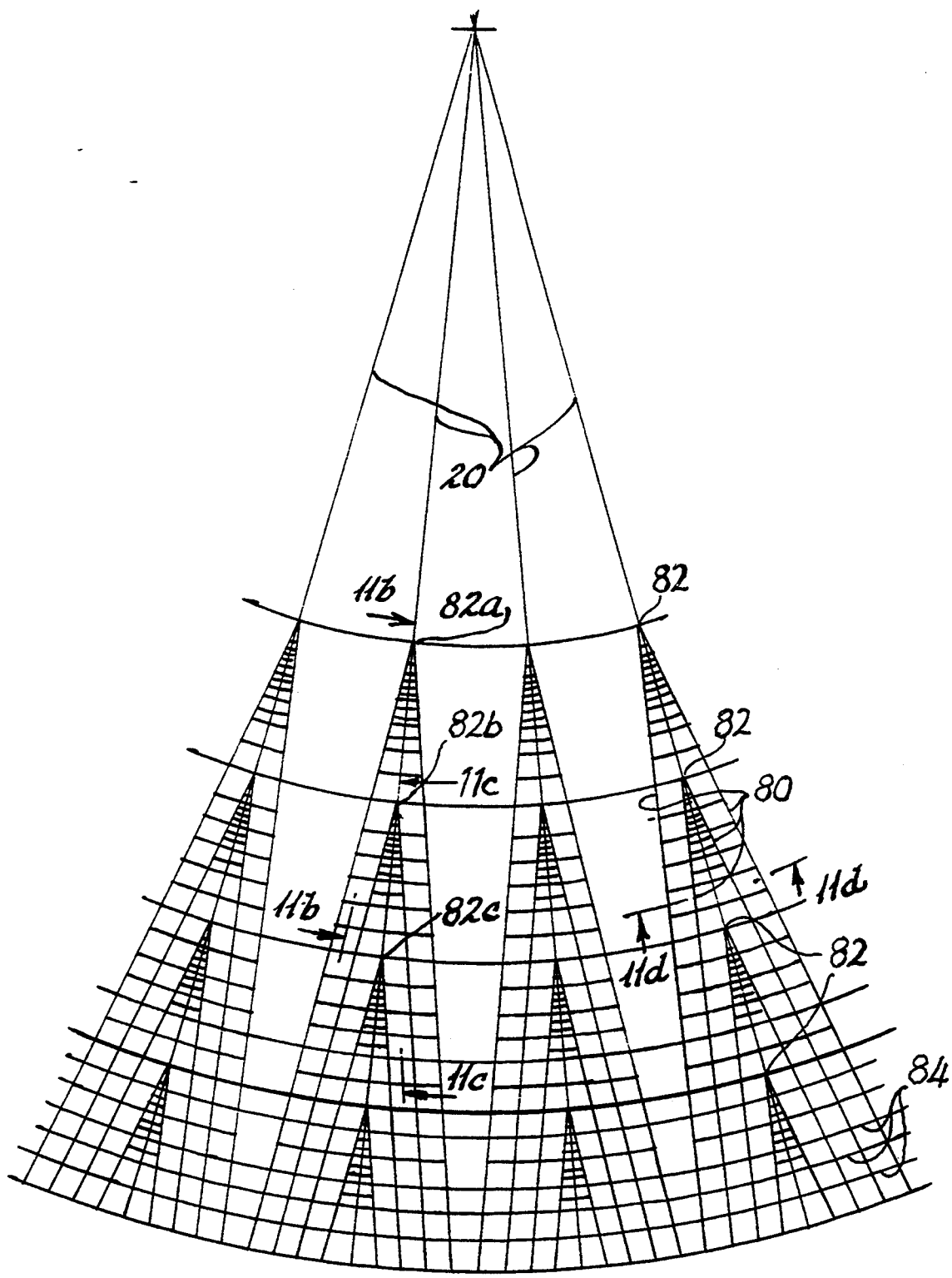
FIG. 11a is a schematic top plan view illustrating a modification of the diaphragm of FIGS. 8a–8d and 9.
Figure 11B:
Figure 11C:
Figure 11D:

The diaphragm of FIG. 11a, a modification of FIG. 9, has additional, diverging waves having ridges 80, with each pair of ridges originating in a point 82 along the ridge 20 of a radial wave 16 and diverging out toward the periphery of the diaphragm. As is discernable from FIG. 11a, none of the pairs of diverging ridges 80 originate closer than about the midpoint of the length of ridge 20 of any of the radial waves 16. Additionally, tertiary annular waves 84 extend between the ridges 80 of adjacent diverging waves or, where applicable, between a ridge 80 and the adjacent ridge 20 of a radial wave 16, in much the same manner as the secondary annular waves 26 extend between ridges 20 of adjacent radial waves 16 in FIGS. 8a–8d and 9.

Since the cross-sectional amplitude of each radial wave 16 decreases from a maximum generally midway of the radius of the diaphragm to a minimum at the center and periphery of the diaphragm, while the cross-sectional wavelength of each radial wave increases from the center toward the periphery of the diaphragm, the radial waves 16 become progressively more flat in cross-section toward the center and periphery of the diaphragm. This flattening of the radial waves results in convexities on the high pressure side which are particularly prone to "blow-out", necessitating the use of any or all of the aforementioned deflection limiters, diverging waves and tertiary waves. Since, in effect, replacing the low amplitude and long wavelength of the cross-sectional convexity of each radial wave with a diverging wave results in a plurality of smaller convexities having a much larger amplitude-to-wavelength ratio than the convexity which is replaced, the propensity for blow-out is reduced.

Figure 12:
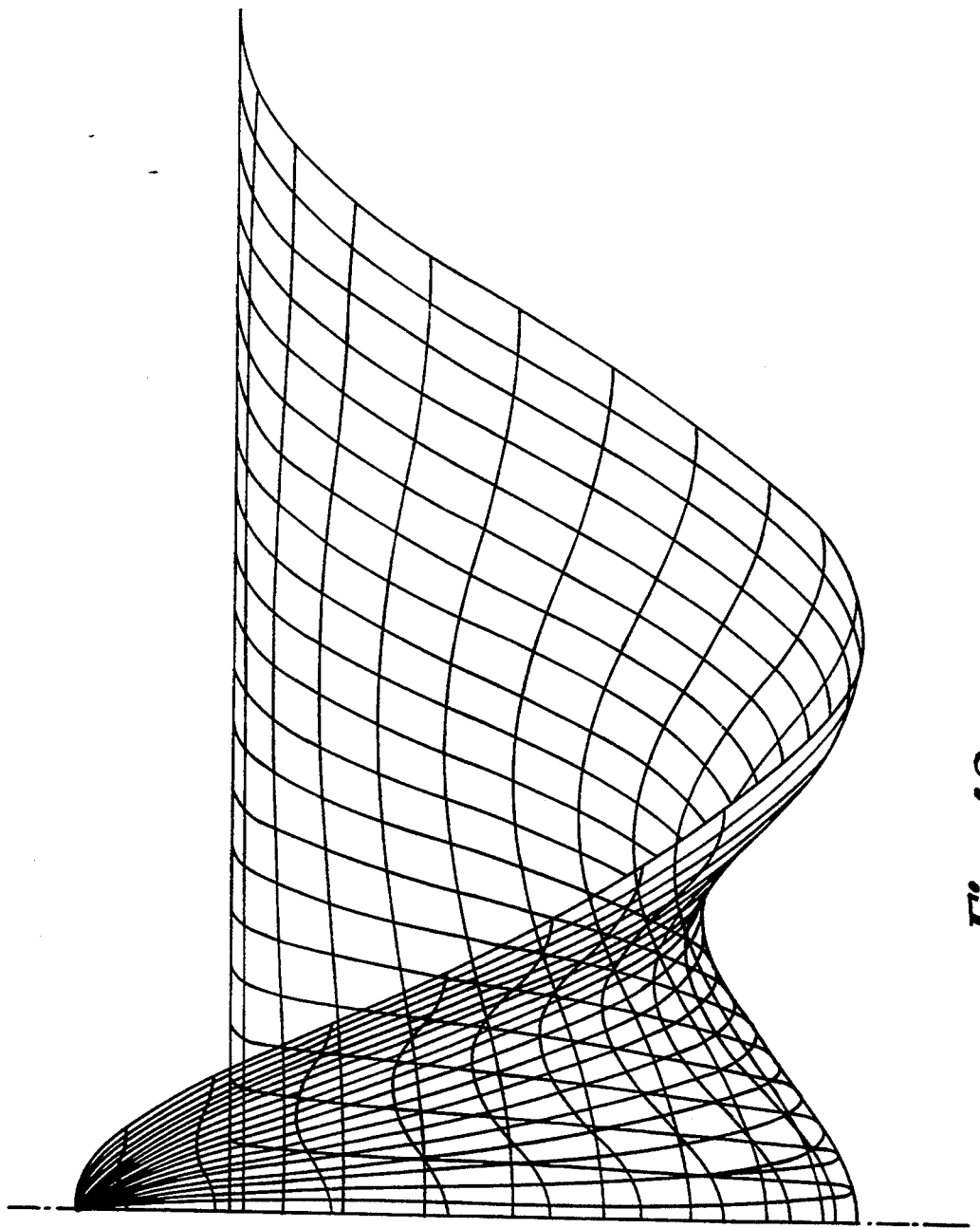
FIGS. 12 and 13 are computer generated illustrations of the diaphragm of FIGS. 1a–1c and thus include isograms which clarify the topography of the diaphragm.
Figure 13:
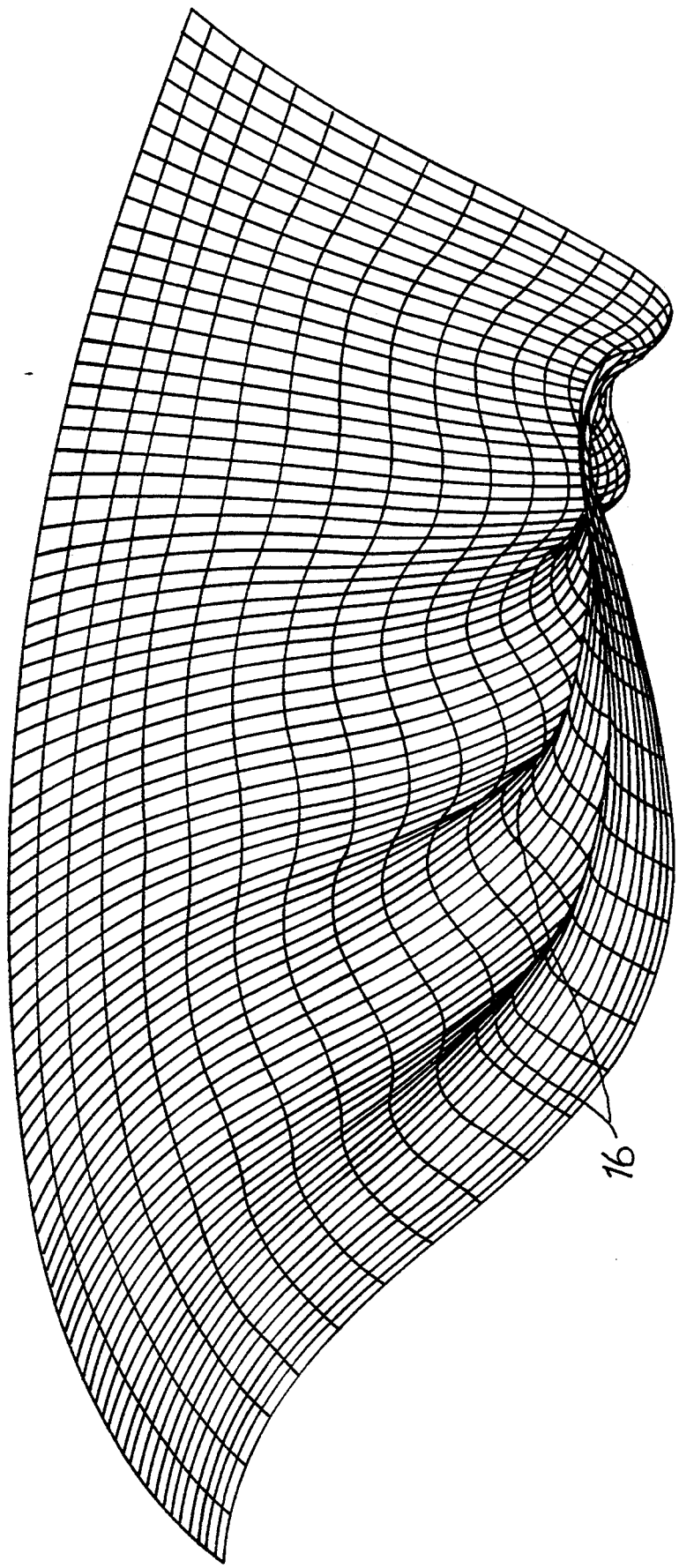

FIGS. 12 and 13 are different views of the diaphragm of FIG. 1a which have been computer generated so as to more clearly illustrate the variations in amplitude of the secondary, radial waves 16 which are superimposed onto the primary, annular wave 12.

Figure 14A:
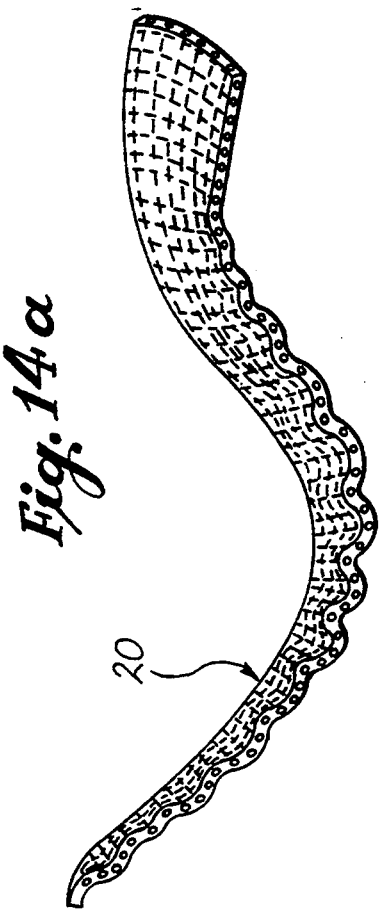
FIGS. 14a and 14b are partial views, similar to those of FIGS. 8a and 8c, of an alternate construction of the diaphragm of the invention.
Figure 14B:
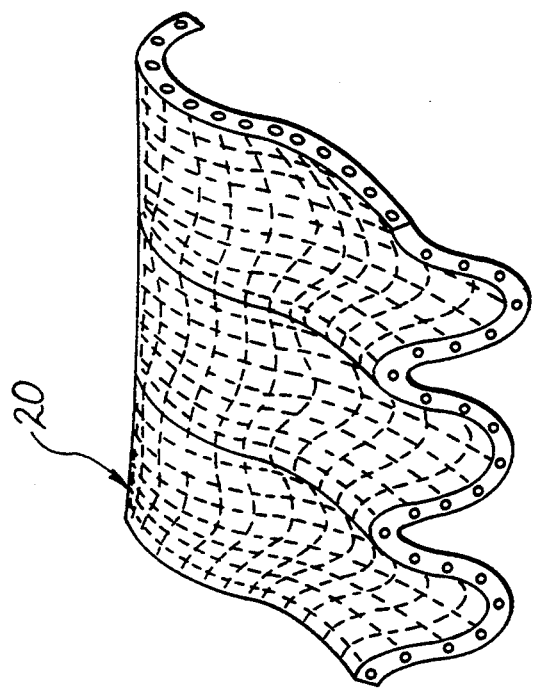

The diaphragm of FIGS. 14a and 14b is similar in contour to that of FIGS. 8a–8d. In this embodiment, the material of the diaphragm is rubber or a rubber-like material with a grid of internal reinforcement. Since this structure is very similar to that of reinforced automobile tires, it is contemplated that the process for manufacturing the diaphragm can be similar to that for manufacturing tires. Interestingly, the illustration of the grid-like reinforcement in FIGS. 14a and 14b also serves to explain the contour of the diaphragm in much the same way as computer generated FIGS. 12 and 13. Additionally, it is contemplated that a similar reinforcing grid can be incorporated into the diagrams of FIGS. 1a–1c so as to mimic the isograms of FIGS. 12 and 13.

Although the structures described above are specifically configured for use with the particular diaphragm of the invention, the deflection limiters and the "sharp hinging" preventers could be used with other forms of diaphragms when structurally modified in accordance with the contours thereof.

It is contemplated that the material of the diaphragm should be generally flexible, springy, non-elastic and self-sustaining, which properties are exhibited by such materials as spring brass, spring steel (including stainless steel), and plastics. Alternatively, it is contemplated that the diaphragm can be constructed from reinforced rubber, as in any of the several types of reinforced rubber tires for automobiles. It is to be understood that the central force transmitting members illustrated herein may be utilized for application and/or reception of diaphragm deflection forces.

Thus, it will be seen that the objects set forth above, among those made apparent from the preceding description, are efficiently attained and, since certain changes may be made in the construction set forth without departing from the scope of the invention, it is intended that all matter contained in the above description or shown in the accompanying drawings shall be interpreted as illustrative and not in a limiting sense.

It is to be understood also that the following claims are intended to cover all of the generic and specific features of the invention herein described, and all statements of the scope of the invention which, as a matter of language, might be said to fall therebetween.

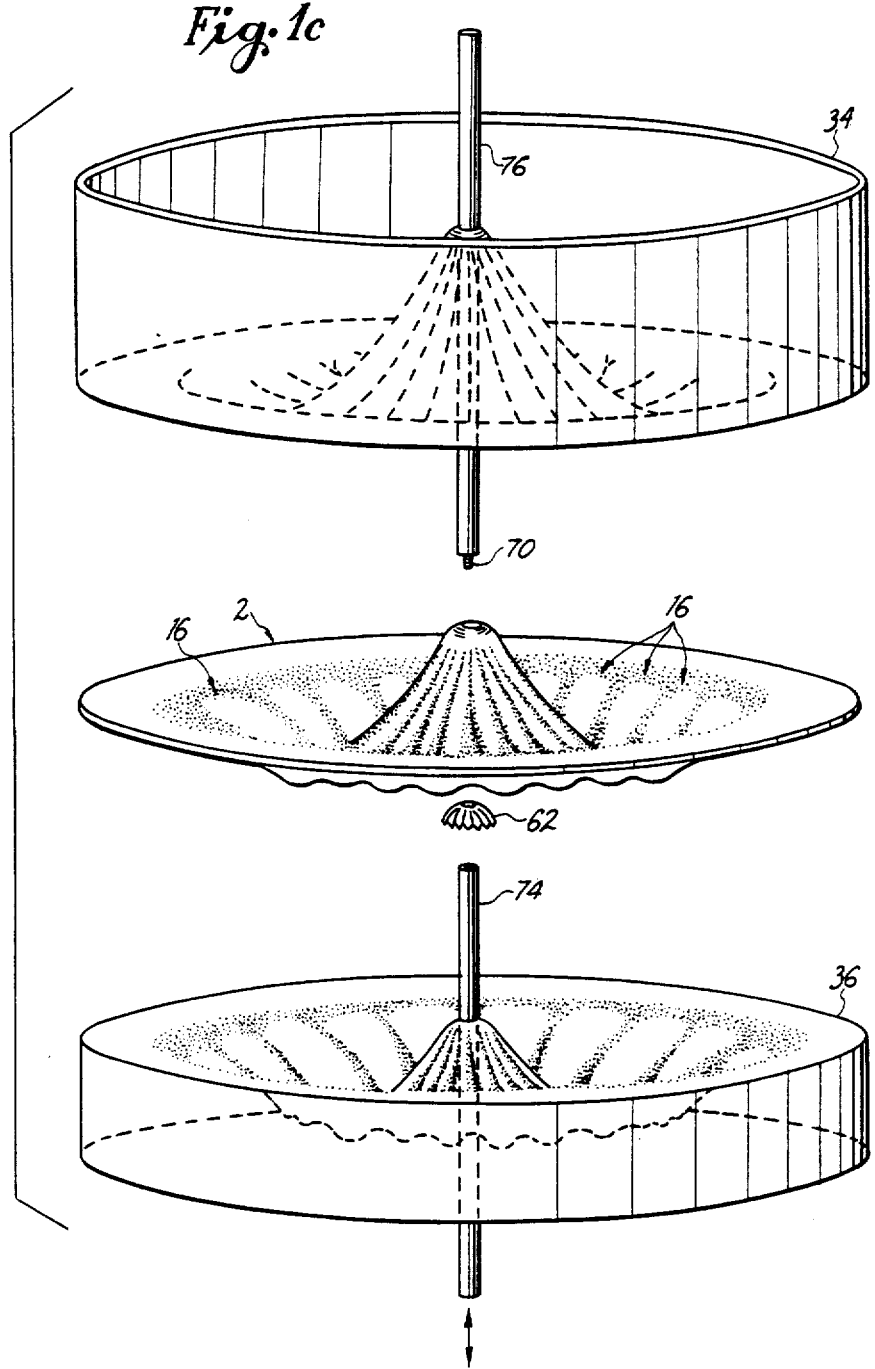

I claim:

1. In a diaphragm composed of generally inelastic material and having an annular outer flange which is engageable with a retainer for said diaphragm, and an inner portion coaxial with and deflectable relative to said outer flange, the improvement in said inner portion comprising, in combination:
    a center;
    a lone, primary annular wave connecting said center and said outer flange and having a general shape, as viewed in cross-section along a radius of said diaphragm, of one full cosine wave;
    a plurality of radial waves integrally superimposed upon said primary annular wave, each of said radial waves radiating from said center toward said outer flange and having a ridge fairing in amplitude from a maximum, generally midway in length of a ridge of said radial wave, to zero generally at said center and at said outer flange; and
    each said radial wave having a general shape, as viewed in cross-section generally normal to said length, of one full cosine wave.

2. The improvement as in claim 1, and further comprising:
    means for preventing sharp hinging of said material, and failure of said diaphragm resulting therefrom, in a generally annular region of intersection between said inner portion and said outer flange.

3. The improvement as in claim 1, and further comprising:
   means for preventing sharp hinging of said material, and failure of said diaphragm resulting therefrom, in a generally annular region of intersection between said inner portion and said center.

4. The improvement as in claim 2, wherein said sharp hinging preventing means comprises:
   an increased thickness of said material in said annular region relative to a thickness in an adjacent area.

5. The improvement as in claim 3, wherein said preventing means comprises:
   an increased thickness of said material in said annular region relative to a thickness in an adjacent area.

6. The improvement as in claim 4, wherein:
   said increased thickness of said preventing means gradually decreases into said thickness of said adjacent area.

7. The improvement as in claim 5, wherein:
   said increased thickness of said preventing means gradually decreases into said thickness of said adjacent area.

8. The improvement as in claim 1, and further comprising:
   a plurality of secondary annular waves integrally superimposed upon said primary annular wave, said secondary annular waves having amplitudes which generally vary from said center to said outer flange as said radial wave amplitudes vary from said center to said outer flanged.

9. The improvement as in claim 8, and further comprising:
   said secondary annular waves fairing in amplitude from a maximum, generally midway between adjacent radial waves, to zero at said ridge of each of said adjacent radial waves.

10. The improvement as in claim 1, and further comprising:
    diverging waves having ridges, pairs of which diverge from points along said radial wave toward said periphery of said diaphragm.

11. The improvement as in claim 10, and further comprising:
    tertiary waves having ridges which span between adjacent ridges of said diverging waves and, where applicable, between a diverging wave ridge and an adjacent radial wave ridge.

12. The improvement as in claim 11, and further comprising:
    said tertiary waves fairing in amplitude, between spanned adjacent ridges, from a maximum generally midway of said span to zero at each end of said span.

13. In a diaphragm assembly, having a diaphragm composed of generally inelastic material and an annular outer flange which is engageable with a retainer of said assembly and an inner portion coaxial with and deflectable relative to said outer flange, the improvement comprising:
    means for preventing sharp hinging of said material, and failure of said diaphragm resulting therefrom, in a generally annular region of intersection between said inner portion and said outer flange;
    said sharp hinging preventing means being an entity which is physically distinct from and engageable with said diaphragm and comprising backing means for providing gradually curving support of said annular region, during deflection of said inner portion relative to said outer flange, in order to prevent said sharp hinging.

14. The improvement as in claim 13, and said backing means further comprising:
    means for engaging a sufficient amount of said inner portion at said deflection, so as to provide a limit to said deflection which is sufficient to prevent a blowout of said diaphragm.

15. The improvement as in claim 14, wherein said engaging means comprises:
    a contoured surface to which generally all of said inner portion of said diaphragm generally conforms so as to provide said limit.

16. The improvement as in claim 13, wherein said backing means comprises:
    a contoured surface to which said annular region conforms during said deflection.

17. The improvement as in claim 16, and further comprising:
    said backing means being of a material and shape capable of flexing in addition to said flexing of said diaphragm material.

18. The improvement as in claim 17, and further comprising:
    said backing means varying in thickness so as to control said flexing.

19. The improvement as in claim 15, and further comprising:
    said contoured surface of said engaging means having channel means for passage of fluid which can displace, and be displace by, said diaphragm.

20. In a diaphragm having an annular outer flange which is engageable with a retainer for said diaphragm, and an inner portion coaxial with and deflectable relative to said outer flange, the improvement comprising:
    a center of said inner portion;
    a lone, primary annular wave of said inner portion connecting said center and said outer flange and having a general shape, as viewed in cross-section along a radius of said diaphragm, of one full cosine wave;
    a plurality of radial waves of said inner portion being integrally superimposed upon said primary annular wave, each of said radial waves radiating from said center toward said outer flange and having a ridge fairing in amplitude from a maximum, generally midway in length of a ridge of said radial wave, to zero generally at said center and at said outer flange, and each said radial wave having a general shape, as viewed in cross-section generally normal to said length, of one full cosine wave; and
    said diaphragm being constructed of a rubber-like material with reinforcing strands.

21. The improvement as in claim 20, and further comprising:
    a grid of said reinforcing strands being imbedded in said rubber-like material.

22. In a diaphragm assembly, having a diaphragm composed of generally inelastic material and an annular outer flange which is engageable with a retainer of said assembly and an inner portion coaxial with and deflectable relative to said outer flange, the improvement comprising:
    means for preventing sharp hinging of said material, and failure of said diaphragm resulting therefrom, in a generally annular region of intersection between said inner portion and said outer flange;

said preventing means comprising backing means for providing gradually curving support of said annular region during deflection of said inner portion relative to said outer flange in order to prevent said sharp hinging; and said backing means comprising a contoured surface to which generally all of said inner portion of said diaphragm is generally conformable during said deflection so as to provide a limit to said deflection which is sufficient to prevent a blowout of said diaphragm, said contoured surface having channel means for passage of fluid which can displace, and be displaced by, said diaphragm.

23. In a diaphragm assembly, having a diaphragm composed of generally inelastic material and an annular outer flange which is engageable with a retainer of said assembly and an inner portion coaxial with and deflectable relative to said outer flange, the improvement comprising:

means for preventing sharp hinging of said material, and failure of said diaphragm resulting therefrom, in a generally annular region of intersection between said inner portion and said outer flange;

said preventing means comprising backing means for providing gradually curving support of said annular region during deflection of said inner portion relative to said outer flange in order to prevent said sharp hinging;

said backing means comprising a contoured surface to which said annular region conforms during said deflection, said backing means being of a material and shape capable of flexing in addition to said flexing of said diaphragm material and varying in thickness so as to control said flexing.

24. The improvement as in claim 13, wherein said diaphragm has opposite, low and high pressure sides, and further comprising:

said sharp hinging preventing means being situated on both of said sides of said diaphragm.

25. The improvement as in claim 14, wherein said diaphragm has opposite, low and high pressure sides, and further comprising:

said sharp hinging preventing means and said engaging means being situated on said low pressure side of said diaphragm.

* * * * *

UNITED STATES PATENT AND TRADEMARK OFFICE
CERTIFICATE OF CORRECTION

PATENT NO : 5,335,584
DATED : August 9, 1994
INVENTOR(S) : Dayne E. Baird

It is certified that error appears in the above-identified patent and that said Letters Patent is hereby corrected as shown below:

Drawings:

The sheet of drawings consisting of Figs. 1b and 1c should be added as shown on the attached sheets.

Signed and Sealed this

Twentieth Day of December, 1994

Attest:

BRUCE LEHMAN

*Attesting Officer*  *Commissioner of Patents and Trademarks*